April 30, 1968 O. BABLER ET AL 3,380,741

RECORD CHANGER

Filed Dec. 27, 1965 2 Sheets-Sheet 1

INVENTORS
OTTO BABLER
EGON STEPHAN BABLER
BY Wallace, Kinzer & Dorn
ATTORNEY.

RECORD CHANGER
Filed Dec. 27, 1965 2 Sheets-Sheet 2
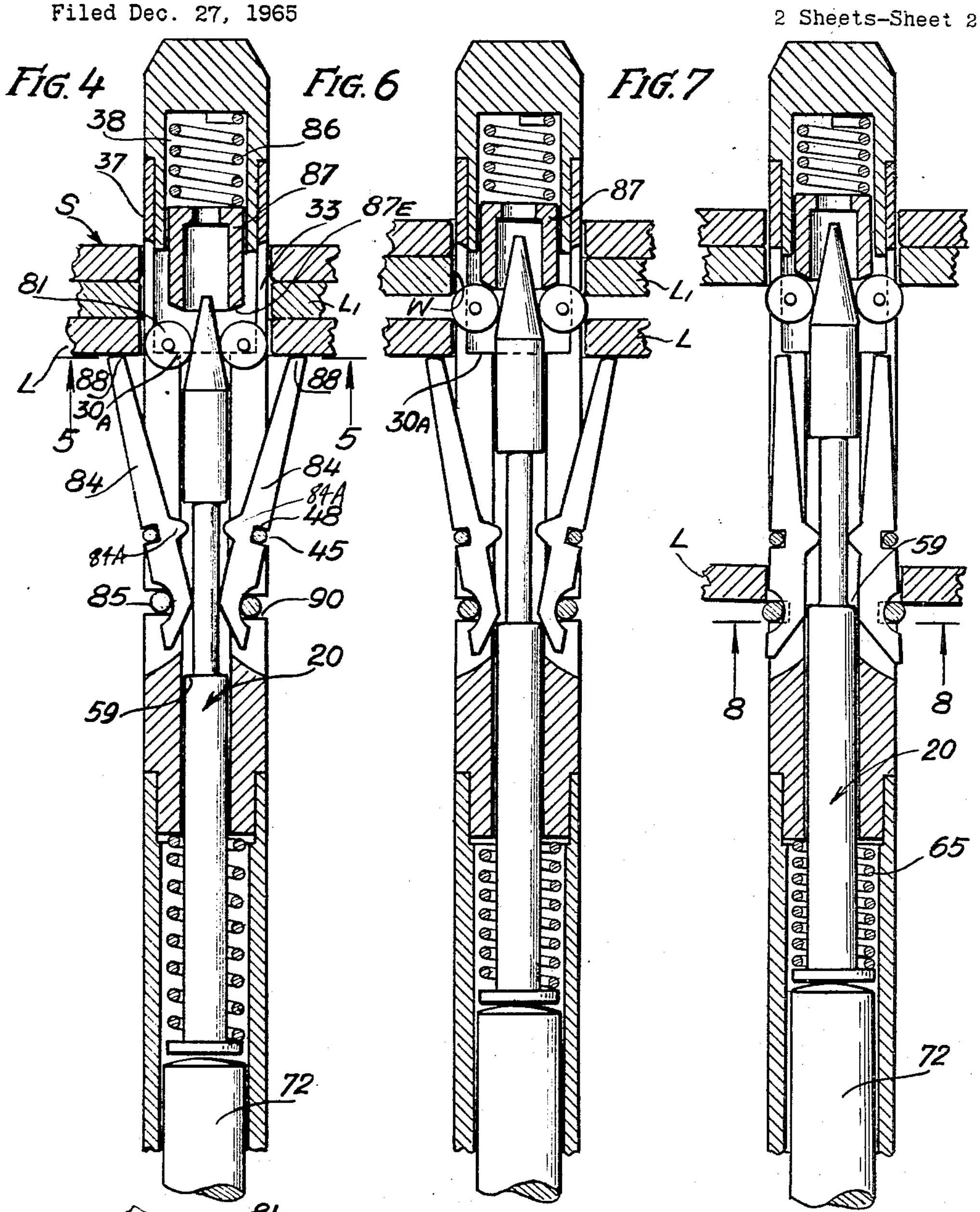
FIG. 4, FIG. 6, FIG. 7
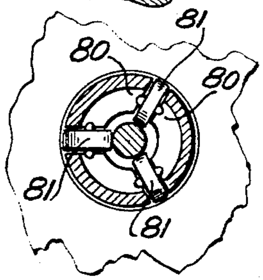
FIG. 5
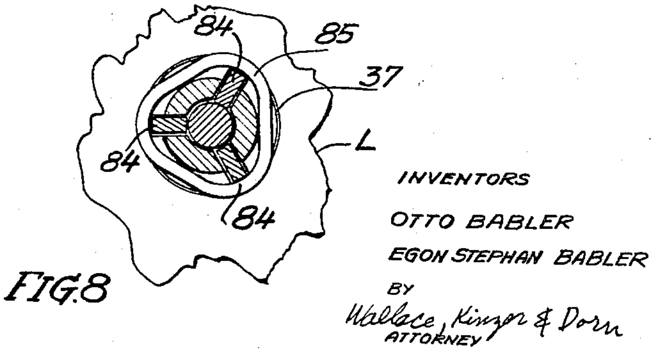
INVENTORS
OTTO BABLER
EGON STEPHAN BABLER
BY
Wallace, Kinzer & Dorn
ATTORNEY 3,380,741
RECORD CHANGER
Otto Babler, 6210 Byron St., and Egon Stephan Babler, 6212 Byron St., both of Chicago, Ill. 60634
Filed Dec. 27, 1965, Ser. No. 516,568
11 Claims. (Cl. 274—10)

This invention relates to record changers for phonographs or the like wherein records are supported and released to a turntable or the like.

The present invention is directed to record changing apparatus for use with a spindle having a substantially straight, shaft-like member upon which the records are centered. This is in contrast to a commonly used offset spindle where an upper portion of the spindle is offset from a lower portion of the spindle thereby forming a shoulder on which the record stack is supported. Where the offset spindle is employed, it is common practice to employ additional holding or stabilizing arm for holding the records on the shoulder of the spindle.

A common practice with known straight spindle record changers is to expand a resilient ring to hold temporarily the stacked records while the lowermost record of the stack is being released. In lieu of an expanded ring, it has been heretofore proposed to flex outwardly leaf spring members to hold the stack during a record releasing operation. Usually the aforementioned resilient elements engage and hold the record stack by exerting a frictional holding force against the interior walls at the center hole in the record.

To expand these resilient rings or leaf spring members requires considerable operating force, and in many instances, requires the use of an oversized motor from that which is needed to supply the operating force for turning a turntable. Accordingly, an object of the present invention is to eliminate such flexible members and to support records temporarily with non-flexed members requiring less operating force to support the stack during a record changing operation.

More specifically, a further object of the invention is to hold temporarily a stack of records with a plurality of loosely confined rings, rollers or balls which are readily movable to engage and to hold temporarily the stack of records.

A further object of the invention is to temporarily hold records during a record changing operation with non-flexed, temporarily supporting members; and after the temporary holding, to support the stack of records on elongated levers extending a considerable distance beyond the periphery of the spindle and having wide and generous support for the stack of records.

The size of the holes in the records is subject to considerable variation and this condition is aggravated by enlargement of the holes after wear. A shortcoming of some prior art record changers is the inability to expand the resilient record supporting member sufficiently to exert sufficient frictional holding forces on the stack when the records with enlarged holes are to be held. This lack of holding force sometimes results in the untimely dropping of a record while the tone arm is engaged with a record on the turntable which may cause considerable damage to the tone arm and to the record on the turntable. Accordingly, another object of the present invention is to eliminate flexible record supporting members which are limited in their extent of movement outwardly of the periphery of the spindle; and to support records having center holes considerably oversize from that of the standard hole dimension.

The spindle supporting the records for 33 r.p.m. and 78 r.p.m. records are quite small in diameter. Thus, the operating members disposed within the spindle and for movements into and out of the confines of the spindle to engage the records are also of small dimensions. The manufacture of relatively small record holding elements with inexpensive, mass production techniques while holding to relatively close dimensional tolerances; has been a considerable problem in the art; and accordingly a further object of the present invention is a record changing apparatus capable of being manufactured inexpensively and at relatively close tolerances.

A further object of the invention is to temporarily support records, during a changing operation, with one piece, rounded support elements radially spaced about the spindle; and to support the stack, after the changing operation, with separate and distinct one piece levers adapted to extend considerably beyond the rounded support elements.

Another object of the invention is an improved record changing device which affords a positive three point supporting for temporary holding of records in lieu of the conventional, non-positive, frictional gripping of the records by some of the prior art record changers. Moreover, the positive holding is self-locking in the sense that the weight of the records on the supporting elements locks the supporting elements from moving.

Other and further objects of the present invention will be apparent from the following description and claims and are illustrated in the accompanying drawings which, by way of illustration, shows preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 4 is another embodiment of the invention for practicing the principles of the present invention;

FIG. 5 is a sectional view taken along the lines 5—5 of FIG. 4 in the direction of the arrows showing annular supporting members and their transverse pintles seated on interior shoulders within the record spindle;

FIG. 6 illustrates the record spindle of FIG. 4 with the operating rod half way on its upstroke;

FIG. 7 illustrates the same spindle with the operating rod in an upper end position and the temporary record holding members holding the stack;

FIG. 8 is a sectional view taken along the lines 8—8 of FIG. 7 in the direction of the arrows shown a resilient band being used to hold a record in an intermediate position;

Figures 1, 2, 3, 9, 10, 11:
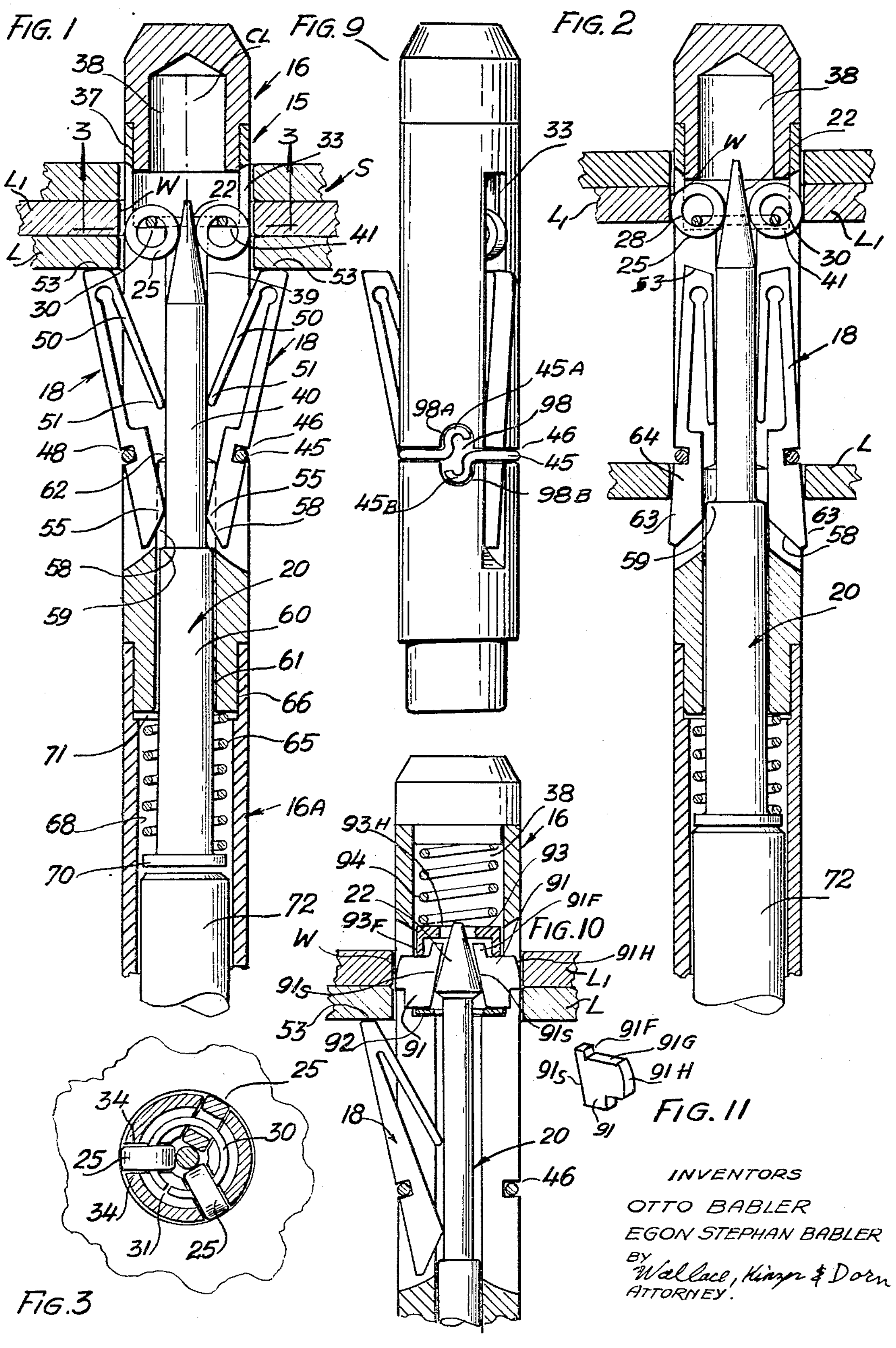
FIG. 1 is an enlarged sectional view of a record changer supporting a stack of records and constructed in accordance with the preferred embodiment of the invention.
FIG. 2 is a sectional view showing the temporary stack supporting elements holding the stack while the lowermost record is being released to the intermediate position.
FIG. 3 is a sectional view taken along the lines 3—3 of FIG. 1 in the direction of the arrows and showing the temporary stack supporting elements and a retaining ring therefor.
FIG. 9 illustrates the manner of locking the retaining ring.
FIG. 10 illustrates another embodiment wherein cams are employed in lieu of the annular members for temporarily holding the stack of records.
FIG. 11 is a perspective view of a cam member employed in the embodiment of FIG. 10.

Referring now to the drawings and more particularly to FIG. 1, there is illustrated a record changing apparatus 15 constructed in accordance with the preferred embodiment of the invention. The record changing apparatus comprises a central spndle or shaft 16 having a plurality of record supporting levers 18 engaging the underside of the stack of records S to support the records while in a stacked condition until it is desired to release the lowermost record for downward sliding movement along the spindle 16 to the turntable (not shown). When it is desired to change a record, the central operating or cam means 20 within the spindle 16 is moved upwardly from the position of FIG. 1 to that of FIG. 2 causing the supporting levers 18 to pivot inwardly within the confines of the spindle 16 while an upper camming means having a conical surface 22 forces the plurality of rounded record supporting members 25 into engagement with the second lowermost record, as seen in FIG. 2, to hold the stack temporarily while the lowermost record L is moving downward toward the turntable.

The present invention is adapted for use with the so-called "center" or "straight" spindles which are of a substantially constant diameter and which have a single axis or centerline CL throughout the length of the spindle, as contrasted with the offset spindle which has the upper portion thereof offset on a centerline different than the centerline of the lowermost portion of the spindle. When records are disposed on the conventional offset spindle, a record stabilizing or stack stabilizing arm (not shown) engages the top of the stack to hold the stack centered on a shoulder between the upper and lower portions of the offset spindle. With the straight spindle of the present invention, the stabilizing arm may be eliminated.

The present invention is particularly adapted for use with records of 33 r.p.m. and 78 r.p.m. having a relatively small center hole which usually falls within the range of 0.284 to 0.300 inch. The present invention also may be used with 45 r.p.m. records having a considerably larger center hole dimension thereby necessitating a spindle of larger diameter or the use of adapter to reduce the hole size to that of 78 r.p.m. and 33 r.p.m. records. Because of the relatively small size of the hole in the 78 r.p.m. and 33 r.p.m. records, the spindle shaft 16 is of relatively small diameter and the record supporting elements 25 are also of a relatively small size to fit within the confines of the spindle 16.

In the preferred embodiment of the invention illustrated in FIGS. 1–3, the record supporting elements 25 are ring-like or annular members having enlarged center holes 28 in which is disposed a circular retaining ring 30 which is split at 31, FIG. 3. One manner of forming the ring-like supporting members 25 is to cut them from a length of tubing, usually of nylon, Delrin or other plastic, although metal may be used.

A can best be appreciated from FIG. 3, there are three record supporting means 25 each of which is disposed in a slot 33 and confined against sideways shifting movement, as seen in FIG. 3, by the side walls 34 milled longitudinally in the spindle 16 to a width approximately that of the ring-like members 25. As can be understood from FIGS. 1 and 2, the milled slots 33 extend inwardly from the peripheral, cylindrical wall 37 of the spindle 16 into an interior hollow chamber or bore 38.

The bore 38 at the upper portion of the spindle 16 is of a larger diameter than a smaller bore 39 immediately therebelow in which slides a stem 40 of the operating cam means 20. At the interface between the bores 38 and 39 there is formed an annular shoulder 41 on which rests the retaining ring 30, FIG. 1, with the operating cam means 20 in its lowered position. As apparent from FIG. 2, the forcing of the record holding members 25 upwardly and outwardly to support the stack of records also moves the retaining ring 30 upwardly from the shoulder 41 between the respective bores 38 and 39.

It will be appreciated that the record supporting means 25 are only loosely confined by the retaining ring 30 from moving completely outward through the slots 33 in the spindle 16. The record supporting means 25 are free to move upwardly and outwardly when pushed by the conical surface 22 on the cam means 20. The freedom of movement of the ring-like members, constituting the record holding means 25, permits the members to revolve about the ring 30 and afford an even distribution of wear about the periphery of ring-like members. Because of their loose arrangement and the large oversize holes 28 in which the retaining ring 30 is disposed, the ring-like members 25 are free for considerable outward movement from the confiines of the spindle wall 37 to engage the walls W of the record holes even if the holes are oversized. Significantly, this freedom of movement permits manufacture of the ring-like members 25 to more reasonable manufacturing tolerances and affords a cheaper mass production of the record supporting means 25. As mentioned previously, the ring-like members 25 may, however, be held to close tolerances by simple grinding operation of the tubular members from which the ring-like members 25 are cut. This loose confining and easy movement of the members 25 may be contrasted with the flexible members of the prior art which require large amounts of force to flex and which are limited in their amount of flexing movement to smaller movements.

The side walls 34 forming the longitudinal slots for the record supporting means 25 also serve to receive the record supporting levers 18 at the lower portion of the longitudinally extending slots 33. It is preferred that three such record supporting levers 18 be disposed equi-distance about the periphery of the spindle 16 and be disposed immediately beneath the record supporting means 25 for supporting the records with a three point suspension. The record supporting levers 18 are each pivoted about and held within the spindle 16 by a circular retaining ring 45 disposed within an annular groove 46 in the peripheral surface 37 of the spindle 16. Each of the record supporting levers 18 is formed with a notch 48 for seating in the retaining ring 45 to constitute the retaining ring 45 as a pivot means for each of the respective record supporting levers 18.

It is preferred practice to form the record supporting levers 18 of integral one-piece construction including an integral leaf spring or leg portion 50 which has a free end 51 in engagement with the stem 40 of the operating cam means 20. When the flexible legs 50 are in their free and relatively unflexed positions illustrated in FIG. 1, the upper flat surfaces 53 of levers 18 are in engagement with the bottom surface of the lowermost record L. The surfaces 53 are relatively wide and are disposed sufficiently outward of the spindle 18 to afford a good and generous bearing surface for a three point support for the record stacks. The weight of the record stack on the flat surfaces 53 of the record supporting levers 18 holds the levers 18 rotated about the retaining ring 45 with their lower pointed surfaces 55 in engagement with the stem 40 thereby affording a positive three point support for the stack of records. The levers 18 may extend radially outwardly from the spindle through a much greater distance than the ring-like members 25, thereby affording a wide spread and firm support.

For the purpose of camming the record supporting levers 18 to within the confines of the spindle 16, as seen in FIG. 2, the lower portions of the record supporting levers 18 are formed with inclined cam surfaces 58 which are adapted to be engaged by an annular cam or shoulder 59 on the operating cam means 20. The shoulder 59 is formed between the upper stem 40 and a lower and larger diameter, cylindrical portion 60 of the operating cam means 20 which slides within a suitable bore 61 which joins the stem bore 39 at 62. Thus, it will be seen that the upward movement of the operating cam means 20 moves the shoulder 59 into engagement with the respective inclined surface 58 causing the lower ends of the record supporting levers 18 to pivot the lower ends outwardly and the upper ends and surfaces 53 inwardly to the position shown in FIG. 2, whereupon the lowermost record L is adapted to slide downwardly toward the intermediate position of FIG. 2.

When the cam means 20 is in the position of FIG. 2, the annular cam shoulder 59 acting on the lower end portions of the record supporting levers 18 pivots the levers 18 to a position in which the lower and outer surface 63 on the lower portions 64 of the levers 18 extend beyond the peripheral surface of the spindle 16. As the surfaces 53 at the top of the levers 18 release the record, the lower surfaces 63 are moved into position to catch the now-released record and to hold the same at the intermediate position of FIG. 2. At this intermediate position, the size of the record can be gauged by a suitable arm (not shown). It should be noted that the conical surface 22 has moved the record supporting members 25 to wedge against the wall W in the record defining a center hole in the now-lowermost record L1 of the stack of records.

When the operating cam means 20 is moved downwardly under the force of a compression spring 65, the respective record supporting levers 18 are rotated by their respective spring members 50 to move the flat record supporting surfaces 53 outwardly and beneath the stack of records. Simultaneously, the outer surfaces 63 on the lower portions 64 of the levers 18 move within the confines of the peripheral wall of the spindle whereby the record at the intermediate position is released to fall to the turntable.

It is preferred that the upper portion of the spindle means 16, which has hereinbefore been described, be of a construction which is readily machined from a cylindrical shaft or tube on an automatic screw machine thereby affording considerable advantage as to mass production at a low cost. This upper portion of the spindle means is preferred to be 1½ inches or less in length and terminating in an exterior thread 66 threading into an interiorly threaded lower spindle portion 16A. Alternatively, the spindle means 16 may be molded from a plastic to afford a low cost spindle means, which is important to the commercial aspect of the present invention. A small plastic cap C may be provided to enclose the upper end of the spindle means 16.

The lower spindle portion 16A has a central bore 68 for receiving the compression spring 65, which is fitted between a flange or collar 70 formed in the lower end of the operating cam means 20 and the lower end 71 of the upper portion of the spindle 16. A push rod 72 is disposed within the bore 68 of the lower spindle portion 16A to engage the collared end 70 of the operating cam means 20 to force the cam means 20 upwardly against the force of the compression spring 65. The cam means 20 is urged to follow the push rod 72 from the position of FIG. 2 to that of the position of FIG. 1 by the compression spring 65 expanding. The push rod 72 is selectively operated by a mechanism (not shown) disposed beneath the turntable.

Upon the dropping of the last record, the cam means 20 overtravels because the conical surface 22 is not limited during its upward movement by the record supporting members 25 engaging a record. The overtravel of the cam means 20 and the push rod 72 can be readily detected by a micro-switch or the like for causing an automatic shut off of the record player after the playing of this last record now moving to the turntable.

In the foregoing embodiment of the invention described in conjunction with FIGS. 1–4, the record holding members 25 are held in place by a retaining ring 30 extending through enlarged central apertures 28 of the respective holding members 25. As previously described in conjunction with FIG. 2, the ring-like members 25 are wedged outwardly against the side walls W of the hole in a record to exert a direct wedging force thereon, this force being more than sufficient to hold a stack of records.

It has been found that by reducing the size of the friction element 25, from the relatively larger ring-like members 25 to smaller annular members 81, FIGS. 4–8, that a different operation ensues during a record changing cycle, namely, that the record supporting members 81 actually pry in between the lowermost record L and the record L1 thereabove, as seen in FIG. 6. During this prying action, the rollers 81, actually lift the stack upwardly from the lowermost record L and the record supporting members 81 are actually disposed beneath the edges of the wall W of the record L1, as contrasted with the engagement of the annular wall W by the members 25, as seen in FIG. 2. This penetration or prying between records breaks the adhesion, that sometimes occurs between the records L and L1, so that the record L is not delayed in release due to the adhesion effect between records.

Although the record supporting members 81 could have central apertures therein to receive a retaining ring 35, it is preferred that such a retaining ring be dispensed with and that small pintles or axle-like members 80 be disposed on opposite sides of the annular member 81, as best seen in FIG. 5. The small pintles 80 hold the circular shaped holding means 81 from sliding through the slots 33 and the pintles 80 also serve to prevent the record supporting members 81 from dropping downwardly towards the record supporting levers 84, FIG. 4.

For the purpose of supporting the stack, a plurality of record supporting levers 84 of FIGS. 4, 6 and 7, are disposed in slots 33 of the spindle 16 and member 85 to have their upper ends 88 in engagement with the under surface of the lowermost record L to support the stack of records. The weight of the record stack S on the record supporting levers 84 hold the record supporting levers 84 with their lower ends inwardly engaging the operating cam means 20 which is of the same configuration and operates in the same manner of the cam means hereinbefore described in conjunction with FIGS. 1–3. Each of the levers 84 has a slot 48 in which is received the retaining ring 45 about which the levers 84 pivot. The resilient ring 85 performs the function of the resilient spring leaf legs 50 of the record supporting means 18 to urge the record supporting levers 84 outwardly from the position shown in FIG. 7 to that of FIG. 4. The resilient ring 85 performs an additional function of stopping the released record during its downward fall at an intermediate position, as seen in FIG. 7, at which position the size of the record may be gauged. The gauging of the record size assures that the tone arm will be accurately positioned when the lowermost record L is dropped from the intermediate position to the turntable. As can best be understood from FIG. 8, the respective levers 84 pivot the lower curved ends to expand the resilient ring 85 to the generally triangular shape shown in FIG. 8, wherein the engaged portions of the resilient ring 85 extend outwardly beyond the peripheral surface 37 of the spindle 16.

After the record has been gauged as to size, the push rod 72, FIG. 7, moves downwardly to allow the force of compression spring 65 to lower the cam means 20 to move the cam shoulder 59 to the position of FIG. 4, wherein the resilient ring 85 resumes its circular shape and remains within the groove 90 therefor. The resilient ring 85 contracts within the peripheral spindle surface 37 to be free of interference of the lowermost record L sliding past to the turntable (not shown).

Another embodiment of the invention is illustrated in FIG. 10, and includes the plurality of record supporting levers 18 having upper, flat surfaces 53 for supporting the records on a three point support in the manner hereinbefore described in conjunction with the embodiment of FIGS. 1 and 2. The embodiment of the invention of FIG. 10, differs from the above described embodiments in the configuration of its record holding members 91. More specifically, the record holding members 91 are generally flat, thin elements, which may be made of a suitable plastic such as Delrin, nylon, or other plastic. The record supporting members 91 are characterized by a rounded, record holding surface 91H which is adapted to be forced into tight engagement with the record L1 to support the stack of records while the lowermost record L is being released by the levers 18.

Each of the members 91 has an inclined surface 91S for engagement with the inclined conical or camming surface 22. In the familiar manner, during upward movement of the cam means 20, the surface 22 camming against the surfaces 91S forces the record holding members 91 radially outward and into holding engagement with the wall W of the record L1. The outward movement of the record supporting members 91 is limited by an upward finger-like portion 91F, engaging an encompassing flange on a circular retainer 93. The circular retainer 93 is biased by a spring 94 to have its lower flange 93F disposed against an upper generally horizontal surface 91G on the respective record supporting members 91. Preferably, the center of the retainer 93 is provided with a center opening 93H for receiving the upper tip portion of the conical surface 22. The retainer 93 is so sized as to slide within the bore 38 and to maintain its position therein. It is preferred that the record supporting members be adapted for seating on a washer like member 92 to prevent the loosely arranged record supporting members 91 from falling downwardly into the elongated slots for the record supporting levers 18. From the foregoing, it will be seen that the record supporting members 91 are limited in their radial expansion by the retainer 93 and thus are maintained by the biasing of the spring 94 against the washer 92 and against the conical or cam surface 22. Also, it will be seen from FIG. 10 that the record supporting levers 18 afford the widely-spaced permanent support and the members 91 afford temporary holding force for a record changing operation.

As an aid to understanding the foregoing, a brief description of the record changer is included herein. When the record is in its upward position, the record supporting levers 18 are disposed in a tri-pod arrangement with their large, upper flat surfaces 53 extending for a considerable distance outwardly of the spindle for engagement with the lowermost record L in the manner illustrated in FIG. 1. The conical surface 22 on the operating cam means 20 is in its downward position allowing the retaining ring 30 to be seated on the shoulder 41 with the rings 25 loosely positioned to the confines of the spindle 16, by the second lowermost record of the stack of records S.

To start a record changing operation, the push rod 72 moves upwardly from the position shown in FIG. 1, to that shown in FIG. 2. As soon as the operating rod 20 starts to move upwardly, the conical cam surface 22 with little resistance, rolls the rings 25 immediately into a wedging engagement with the wall W at the center hole of the second record L1. Because the angle of the conical surface 22 is steep enough to the vertical, the wall W of the record L1, the ring-like member 25 and the cam 22 will be locked together. Thus, a further upward movement of the conical cam surface 22 lifts the record L1 together with the records thereby breaking any adhesion between records L and L1. The lifting force on the operating rod 20 will be equal to the weight of the records to be lifted. This force is much smaller than the force required for operating conventional record changers where flexible members have to be flexed into engagement with the wall at the record hole and flexed further to obtain enough friction to hold the record stack during the change cycle.

The loosely confined record supporting members 25 are free for large radial movements and are not limited in movement as are the flexed prior art members. Hence, the members 25 are free to move to engage with the wall W of the record hole irrespective of whether or not the hole is slightly oversized. When it is considered that the spindle 16 is relatively small in diameter and that the record supporting means are much smaller yet, the ability to hold oversize records will be appreciated.

The lifting of the records upwardly from the lowermost record, removes the weight of the upper records thereby reducing the amount of force required to pivot the levers 18 or 84 inwardly as the upper surfaces of the levers slide along the lower surface of the lowermost record. This upward lifting movement of the stack is important in that it breaks the adhesion sometimes present between the lowermost record of the stack and the record immediately thereabove. This adhesion has been known to cause a time delay of the release of the lowermost record sometimes dropping the record on the tone arm.

After the temporary support of the stack S by the ring-like members 25, the collar 59 of the cam means 20 moves into engagement with the inclined surface 58 on the respective record supporting levers 18 to pivot upper end surfaces 53 of the respective levers 18 inwardly to the position of FIG. 2. Simultaneously, integral legs 50 on the levers 18 are flexed to return the levers 18. When the cam shoulder 59 moves upwardly to the position shown in FIG. 2, the upper end surfaces 53 of the levers 18 are within the confines of the spindle 16 permitting the lowermost record L to slide therepast to the surfaces 63 on the lower ends of the levers 18. The surfaces 63 on the levers 18 stop the downward movement of record L and hold the same for gauging as to size. The record L is held in this intermediate position of FIG. 2, until the rod 72 moves downwardly.

Downward movement of the push rod 72 and the cam means 20 permits the stack of records and the record supporting means 25 to move downwardly as a unit thereby affording time for the legs 50 to flex the upper, flat surface 53 of the levers 18 outwardly into position to engage and to support the stack. The weight of the stack holds the record supporting means 25 in a locked position against the cam surface 22 as the cam means 20 moves downwardly until the conical surface 22 moves downwardly sufficiently to render the ring 30 effective to prevent further downward movement of the record supporting members 25, as seen in FIG. 1. At this time, however, the surfaces 53 of the levers 18 are in position to halt further downward movement of the stack towards the turntable.

In the embodiment of the invention illustrated in FIGS. 4–8, the upward movement of the operating rod 20 moves the smaller diameter, annular members 81 upwardly to engage the periphery of the wall W of the center hole of the record L1 and to penetrate between the records L and L1, as seen in FIG. 6, wherein the operating rod 20 is approximately half way through its upward stroke. The penetration and prying of the rollers 81 between the records L and L1 is aided by the spring force afforded by a biasing means in the form of a spring 86 and a plunger 87 disposed in the bore 38 above the members 81. The lower edge 87E of the plunger 87 is beveled and engages the interior portions of members 81, that is, interior of their pintles 80. The spring 86 and plunger 87 thus exert a force to urge the annular members 81 outwardly to pry or penetrate between the records L and L1 as the cam surface 22 and rod 20 move upwardly. After penetration, as seen in FIG. 6, further upward movement of the conical surface 22 from the position of FIG. 6 to the position of FIG. 7, lifts the record stack from the record L. Simultaneously, with the lifting of the stack of records on the support members 81, the record supporting levers 84 retract their upper ends to the periphery of the spindle allowing the record L to descent therepast to engage the resilient ring 85 at the intermediate position, as seen in FIG. 7. Small projections 84A on the levers 84 engage the cam shaft 40, as best seen in FIG. 7, to hold the slots 48 from movement from the pivot ring 85.

During a subsequent down stroke of the push rod 72 and rod 20, the records are still supported on the members 81 which remain in their record supporting positions. In the meanwhile, the upper surfaces 88 of the record supporting levers 84 pivot outwardly due to the resilient band 85 contracting and pivoting the lower ends of the levers inwardly. When the push rod 72 and rod 20 reach the position of FIG. 4, the annular members 81 are again loosely confined by the conical surface 22 and by the shoulder 30A.

A feature of the present invention is the manner of securing the encircling retaining ring 45, against expansion from its groove due to the force exerted thereon by the levers 18 or 84, which are pivotally mounted thereon. More particularly, the peripheral surface 37 of the spindle means 16 is formed with an annular recess or groove 46 which is intersected by a longitudinally extending recess 98, FIG. 9, which is adapted to receive the curved ends *45a* and *45b* of the ring 45 to prevent the ring from expanding due to the weight of the records on the supporting levers. More specifically, the curved ends *45a* and *45b* are seated in a recess 98. The weight of records on the levers 18 is resisted by the ends *45a* and *45b* of the ring 45, engaging the respective surfaces *98a* and *98b* of the recess 98. If desired, the ends *45a* and *45b* could be twisted and interlocked together and turned at right angles to fit within the recess 98.

From the foregoing, it will be seen that in accordance with the present invention, widely spaced generous areas of support are provided on levers for non-temporary support of records and that non-flexed, temporary members are readily cammed with a light force to hold the second-lowermost record, during the record changing operation. In the preferred form, the temporary record supporting members are annular in configuration affording an expensive and readily mass produced construction. The temporary record supporting members are free for considerable movement without the requirement of a strong operating force as in the case of the flexible sleeves or flexible fingers employed with prior art record changers, which require that the holding members be flexed before moving into frictional engagement with the walls W of the holes in the records. The upper and lower portions of the record spindle are inexpensive to manufacture and assemble thereby affording a commercially desirable and feasible spindle.

Hence, while preferred embodiments of the invention have been described and illustrated, it is to be understood that these are capable of variation and modification.

We claim:

1. In a record changing apparatus for supporting a plurality of records while in a stacked condition and for releasing the lowermost record for downward movement towards a turntable, vertically oriented spindle means having an outer peripheral surface about which are centered the records with center holes in the records disposed on said spindle means, an inner bore in said spindle means, openings in said spindle means extending from said peripheral surface to said bore, a plurality of stack supporting lever means pivotally mounted in said bore and biased to extend through said openings for record supporting engagement with the lowermost record of a stack of records, said lever means being pivotal to a position adjacent to the peripheral surface of the spindle means to permit records to move therepast towards said turntable, cam means disposed within said bore and movable to cam said lever means to permit records to move therepast, means, upward of said lever means, to support records temporarily during a record changing operation, said last-mentioned means including a plurality of annular supporting means, each having an axis parallel to said turntable, disposed in said openings and each movable in a plane substantially perpendicular to its axis upwardly and outwardly of said spindle means to engage and to temporarily support the record stack while the lowermost record is being released by said lever means, said annular means being biased out of engaging position, and camming means in said bore for moving said annular supporting means to support said records.

2. The record changing apparatus of claim 1 wherein said lever means are elongated levers having upper end portions for holding said record stack, intermediate portions and lower end portions pivotable outwardly of said peripheral surface for holding a released record at an intermediate position, means pivotally mounting said levers at said intermediate portions, said cam means controlling pivotal movement of the respective upper end portions, and controlling pivotal movement of the respective lower end portions.

3. The record changing apparatus of claim 1 wherein said lever means are elongated and have upper portions to engage and support the records, and including means to pivotally mount said lever means at a point beneath said upper portions, the upper portions being pivotable outwardly to afford a widely spaced suspension, and retaining means for limiting said upward and outward movement of said annular means.

4. The record changing apparatus of claim 1 including retaining means for limiting said upward and outward movement of said annular means wherein said annular supporting means are ring-like elements each having an enlarged center hole, and wherein said retaining means comprises an annular ring extending through said holes and having a thickness smaller than the diameters of said holes in said ring-like elements which permits said ring-like elements to move both upwardly and outwardly by said camming means while being retained in said openings by said retaining means.

5. The record changing apparatus of claim 1 wherein each of said lever means includes a spring leaf member thereon for urging its associated lever means to a record supporting position.

6. The record changing apparatus of claim 1 wherein said annular supporting means have portions interior of said peripheral surface, biasing means disposed opposite said camming means for exerting a biasing force outwardly of said spindle on said portions of said annular supporting means upon upward movement of said annular supporting means, said annular supporting means being of small enough size such that said biasing means and said camming means force said annular supporting means to penetrate between records to lift the records thereabove and to support the records from beneath the stack.

7. The record changing apparatus of claim 2 including a groove in the periphery of said spindle means intermediate thereof, and expandable means for supporting a record at a size sensing position disposed in said groove and engaged by the lower end portions of said lever means, said lever means pivotable in one direction to expand said expandable means outwardly of the confines of the periphery of the spindle to engage and support a record while it is being gauged for size.

8. The record changing apparatus of claim 2 wherein said means for pivotally mounting said lever means is a wire-like member substantially encircling said spindle means and having transverse bent end portions, said spindle means having an annular groove therein to receive said wire-like member, said spindle means having a longitudinally extending recess for receiving said transverse bent end portions of said wire-like member.

9. In a record changing apparatus for supporting and releasing records for movement towards a turntable, spindle means having a hollow interior and having an outer peripheral surface about which may be disposed the walls of the center holes of said records, said spindle means having a plurality of slots extending from the hollow interior to the outer peripheral surface, a plurality of separate, individual annular record supporting rings, each having a peripheral surface, disposed in said hollow interior, said rings being rollable upwardly and outwardly of said spindle means to partially extend through said slots at said peripheral surface of said spindle means to engage and support the records, retention means limiting said upward and outward movement of said rings, and axially moveable cam means defining a tapered surface about which said rings are disposed, axially disposed in said bore of said spindle and engageable with the peripheral surfaces of said rings interior of the spindle means to cam said annular supporting rings to a record supporting position.

10. The record changing apparatus of claim 9 wherein said spindle means is comprised of an upper piece and a lower piece, said upper piece having said hollow interior and said slots, each of said pieces having the same external diameter, said lower piece having a hollow interior coaxial with said upper piece, and said upper and lower pieces having interfitting ends joined together to constitute a spindle means.

11. The record changing apparatus of claim 9 including an axially moveable shaft on which is formed said cam means, said individual rings engaging said second cam means and limiting upward movement of said shaft when supporting a record, said individual members being adapted to move further outwardly of said openings when no record is present and to allow said shaft to move further upwardly to institute a shut-off operation.

References Cited

UNITED STATES PATENTS

| | | | |
|---|---|---|---|
| 2,689,735 | 9/1954 | Morrison | 274—10 |
| 2,845,271 | 7/1958 | Scheller et al. | 274—10 |
| 2,981,953 | 4/1961 | Hansen | 274—10 |
| 3,021,144 | 2/1962 | Harnisch et al. | 274—10 |
| 3,201,131 | 8/1965 | Ansar et al. | 274—10 |
| 3,214,176 | 10/1965 | Morrison | 274—10 |
| 3,216,729 | 11/1965 | Babler | 274—10 |
| 3,257,114 | 6/1966 | Hansen | 274—10 |
| 3,279,797 | 10/1966 | Goulding | 274—10 |

FOREIGN PATENTS

| | | |
|---|---|---|
| 1,034,383 | 7/1958 | Germany. |

LEONARD FORMAN, *Primary Examiner.*

JOEL M. FREED, *Assistant Examiner.*